United States Patent
Ting et al.

(10) Patent No.: US 8,086,956 B2
(45) Date of Patent: *Dec. 27, 2011

(54) ISOLATED ORDERED REGIONS (IOR) NODE ORDER

(75) Inventors: Edison Lao Ting, San Jose, CA (US); James C. Kleewein, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 899 days.

This patent is subject to a terminal disclaimer.

(21) Appl. No.: 11/837,712

(22) Filed: Aug. 13, 2007

(65) Prior Publication Data

US 2008/0033975 A1   Feb. 7, 2008

Related U.S. Application Data

(63) Continuation of application No. 10/604,450, filed on Jul. 22, 2003.

(51) Int. Cl.
*G06F 17/27* (2006.01)

(52) U.S. Cl. .......... 715/234
(58) Field of Classification Search .......... 715/237
See application file for complete search history.

(56) References Cited

U.S. PATENT DOCUMENTS

| | | | |
|---|---|---|---|
| 5,970,489 A | 10/1999 | Jacobson et al. | |
| 6,359,635 B1 | 3/2002 | Perttunen | |
| 6,549,221 B1 * | 4/2003 | Brown et al. | 715/854 |
| 6,941,521 B2 * | 9/2005 | Lin et al. | 715/762 |
| 2002/0118214 A1 | 8/2002 | Card et al. | |
| 2004/0024739 A1 * | 2/2004 | Copperman et al. | 707/1 |
| 2004/0168119 A1 * | 8/2004 | Liu et al. | 715/501.1 |

* cited by examiner

*Primary Examiner* — Laurie Ries
*Assistant Examiner* — Tionna Smith
(74) *Attorney, Agent, or Firm* — IP Authority, LLC; Ramraj Soundararajan

(57) ABSTRACT

Method for ordering nodes within hierarchical data. The concept of isolated ordered regions to maintain coordinates of nodes is used by associating each node with coordinates relative to a containing region. Modifications to nodes within a region only affect the nodes in that region, and not nodes in other regions. Traversals that retrieve information from the nodes can rebase the coordinates from their containing region and return with a total order.

13 Claims, 21 Drawing Sheets

ISOLATED ORDERED REGIONS (IOR) NODE ORDER

RELATED APPLICATIONS

This application is a continuation of U.S. application Ser. No. 10/604,450, filed Jul. 22, 2003.

BACKGROUND OF THE INVENTION

1. Field of Invention

The present invention relates generally to the field of ordering nodes. More specifically, the present invention is related to ordering nodes within hierarchical data.

2. Discussion of Prior Art

A tree structure comprising nodes is a type of data structure in which each element is attached to one or more elements directly beneath it. The connections among elements in a tree structure are called branches. Trees are often called inverted trees because they are normally drawn with the root at the top. Inverted trees are the data structures used to represent hierarchical file structures. In this case, the leaves are files and the other elements above the leaves are directories.

Tree structures have been used in prior art data processing systems to organize data. But, such prior art fails to provide for a system for ordering nodes within hierarchical data in a mark-up language-based document. Additionally, such prior art systems fail to teach a method or system for ordering nodes into a plurality of regions, wherein each of the regions defines an area within a two-dimensional space.

The following references provide for a general teaching with regard to hierarchical structures, but they fail to provide for the claimed invention's method and system.

U.S. Pat. No. 5,970,489 discloses a method for using region-sets to focus searches in hierarchical structures. The method improves a search in a hierarchical structure by focusing the search to selected regions within the structure. The method defines one or more region-set(s) and uses the region-set(s) as either a filter for the results of a key-word search or an integrated part of a search engine to increase the efficiency of the search engine. The method also provides for dynamic creation of new region-set(s) from existing region-set(s) using a prescribed set of operators.

U.S. patent application publication 2002/0118214 A1 provides a system and method for browsing node-link structures based on an estimated degree of interest. The disclosed invention enables a user to view large collections of linked information on a computer-based display. A visualization is created which presents a representation of the complete collection of information on the display. The visualization fits completely within a fixed area of the computer-based display, negating the need to scroll information into the display area. The visualization is based on identified focus nodes and through calculation of a Degree of Interest (DOI) for each of the nodes based in the structure. Layout and presentation of the visualization structure are based on the DOI values in combination with considerations of available display space. A user may dynamically manipulate views of the structure by selecting one or more focus nodes, thus causing a recalculation of the degree of interest.

U.S. Pat. No. 6,359,635 provides for methods, articles, and an apparatus for visibly representing information and for providing an input interface. Display and/or input regions to represent a plurality of tree-related elements include: a region to represent a root element; at least two concave regions to represent at least two non-root, internal elements; and at least two regions to represent at least two leaf elements. In a particular embodiment, a first concave region is radially adjacent to both a second concave region and a third concave region, the second concave region angularly adjacent to the third concave region, and a radial width of the second concave region differing from a radial width of the third concave region.

Whatever the precise merits, features, and advantages of the above cited references, none of them achieves or fulfills the purposes of the present invention.

SUMMARY OF THE INVENTION

The present invention provides for a system and method for ordering a plurality of nodes associated with entities in a document, wherein the system comprises: (a) a node generator parsing the entities in a document and creating a plurality of nodes that represent the entities and relationships that exists among the entities; (b) a node grouper grouping said created plurality of nodes into a plurality of regions, each of said regions defining an area within a two-dimensional space; and (c) a formatter for formatting said plurality of regions for storage in one or more pages.

Modifications to nodes within a region only affect the nodes in that region—not nodes in other regions. Traversals that retrieve information from the nodes can rebase the coordinates from their containing region and return with a total order.

The present invention also provides for a method for ordering nodes in a document via isolated ordered regions, said method comprising the steps of: (a) parsing the document; (b) creating nodes representing entities of the document and a relationship that exist among the entities; (c) mapping the created nodes based upon a level and step associated with each of the nodes; (d) grouping the mapped nodes into a plurality of regions, wherein the grouping identifies, for each of said regions, at least the following parameters: a minimum step, a minimum level, a maximum step, a maximum level, and the parameters give a region its dimension and order within said document; (e) ordering the regions based upon ascending minimum step and minimum level; (f) calculating step range associated with each of the regions; and (g) reordering the regions based upon ascending step range, minimum level, and minimum step, wherein the reordering reflect parent-child relationships among the nodes.

DESCRIPTION OF THE PREFERRED EMBODIMENTS

Figure 1:
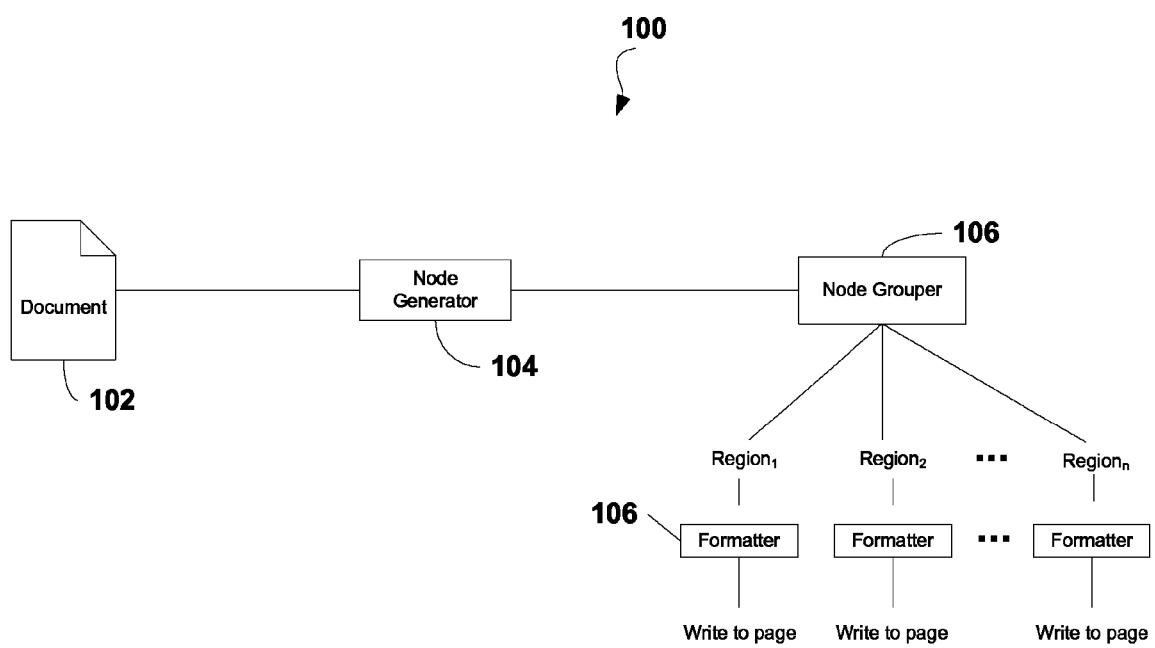
FIG. 1 illustrates an overview of the system of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered an exemplification of the principles of the invention and the associated functional specifications for its construction and is not intended to limit the invention to the embodiment illustrated. Those skilled in the art will envision many other possible variations within the scope of the present invention.

The present invention presents a system and method for ordering nodes within hierarchical data using the concept of isolated ordered regions to maintain the coordinates of nodes by associating each node with coordinates relative to a containing region. Based upon the claimed invention, modifications to nodes within a region only affect the nodes in that region—not nodes in other regions. Traversals that retrieve information from the nodes can rebase the coordinates from their containing region and return results with a total order.

Figure 2:
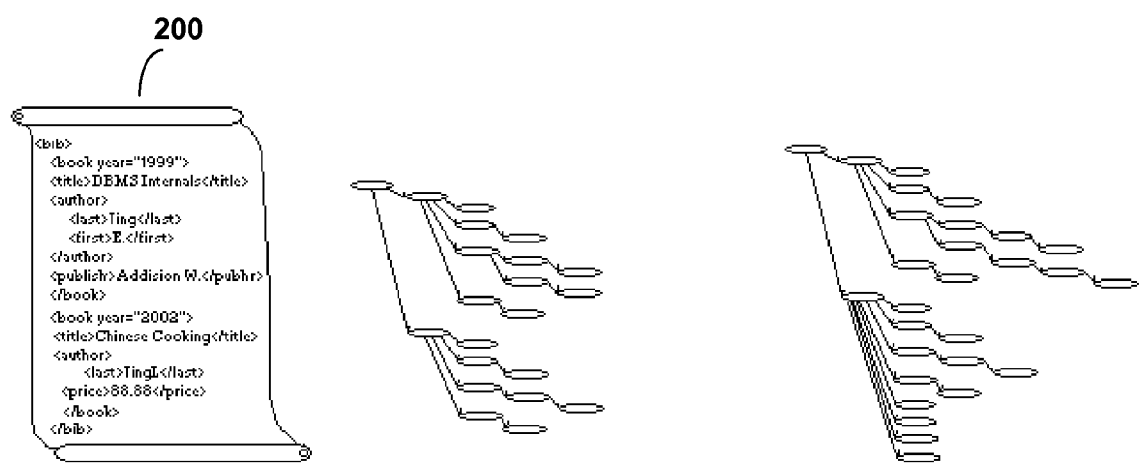
FIG. 2 illustrates how, in a specific example, nodes from an XML document are extracted.

FIG. 1 illustrates an overview of the system 100 of the present invention. Document 102, containing hierarchical data (e.g., a document in a mark-up language-based format such as XML), is stored by creating nodes, via node generator 104, that parses and represents the entities of the document and the relationships that exist among the entities. The nodes are grouped into regions (i.e., Region $R_1$ through $R_n$) via region grouper 106 and are formatted via formatter 108 and written out to pages. As the nodes are created, they are grouped into regions in various ways depending upon anticipated access patterns and usage. Each region is formatted and stored into pages managed by the system. There can be more than one region written to a page. FIG. 2 illustrates how, in a specific example, nodes from an XML document 200 are extracted.

It should be noted that although throughout the figures and specification an XML document has been used to illustrate the functionality associated with the system and method of the present invention, other hierarchically-ordered documents, such as documents in mark-up language formats such as HTML, can be equally used in conjunction with the present invention. Therefore, the scope of the present invention should not be limited by the type of hierarchically-ordered document.

Figure 3A:
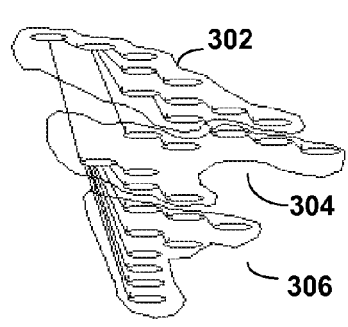
FIGS. 3a-c illustrate differing sets of regions formed from a representative XML document.
Figure 3B:
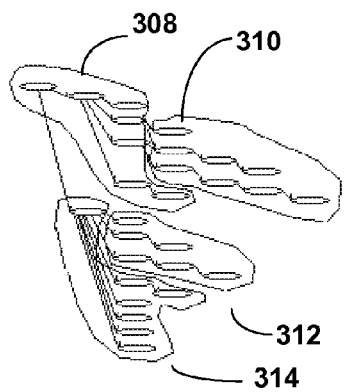
Figure 3C:
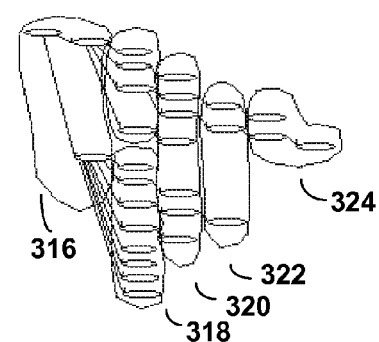
Figure 4B:
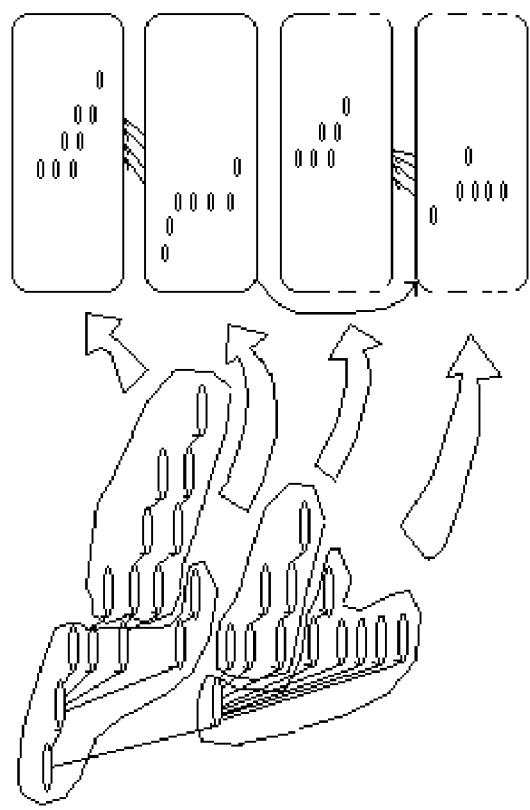
FIGS. 4a and 4b illustrate the next stage, wherein the regions as defined in FIGS. 3a and 3b are ordered and stored in pages.
Figure 4A:
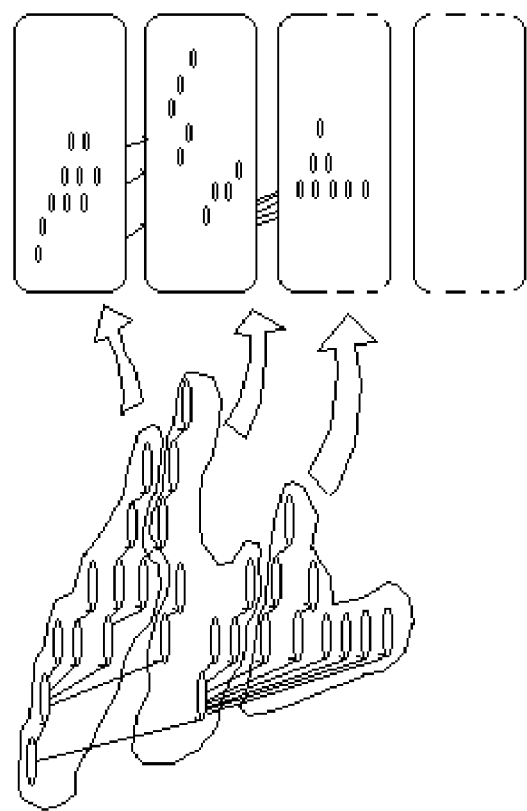

FIGS. 3a-c illustrate differing sets of regions formed from a representative XML document 200. In this example, a set of nodes representative of an XML document can be broken, in FIG. 3a, into three regions 302, 304, and 306. Similarly, in FIGS. 3b and 3c, the same set of nodes is broken into regions 308-314 and 316-324, respectively. FIGS. 4a and 4b illustrate the next stage, wherein the regions as defined in FIGS. 3a and 3b are ordered and stored in pages.

Based upon the present invention, each region has a number of values associated with it, wherein these values are computed using algorithms, to be outlined later. Each region has a Minimum Step (Min Step), Minimum Level (Min Level), Maximum Step (Max Step), Maximum Level (Max Level), and Step Range. The Min Step, Min Level, Max Step, and Max Level numbers give a region its dimensions and order within the document.

Figure 5B:
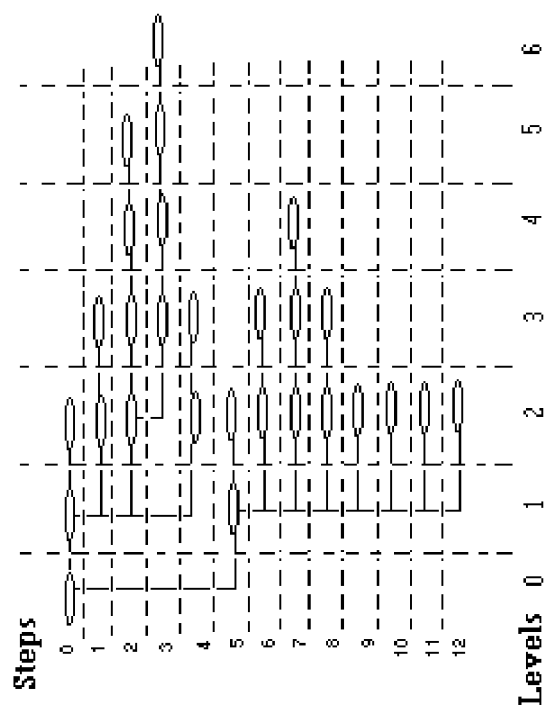
FIGS. 5a and 5b illustrate a specific example depicting the mapping of nodes in a hierarchically structured document based upon steps and levels.
Figure 5A:
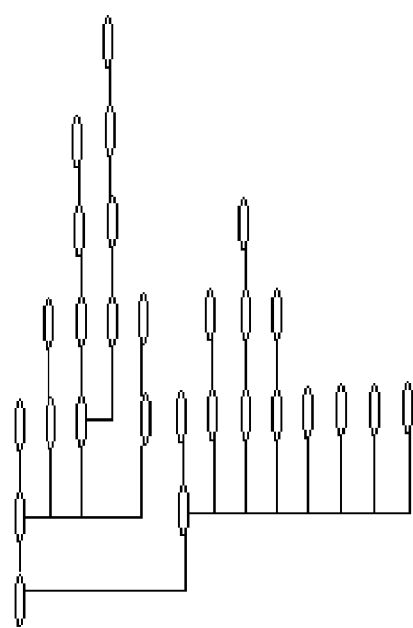

FIGS. 5a and 5b illustrate a specific example depicting the mapping of nodes in a hierarchically-structured document based upon steps and levels. The following algorithm, based on a set of rules, is used in such a mapping:

For every descendant
Level=Level+1
For every ancestor
Level=Level−1
For every [>1st] child node
Step=Step+1

Figure 6:
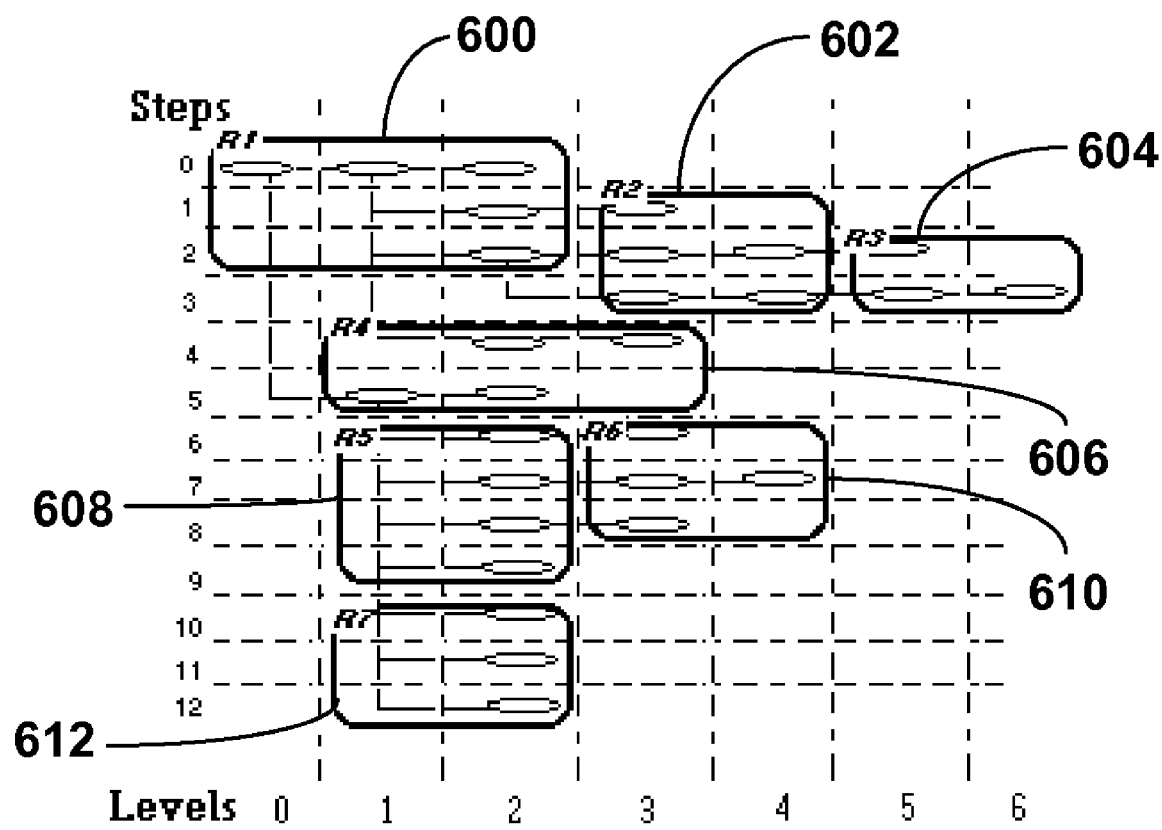
FIG. 6 illustrates mapped nodes that are grouped in a plurality of regions, i.e., R1, R2, R3, R4, R5, R6, and R7.

Next, as in FIG. 6, the mapped nodes are grouped in a plurality of regions: R1 600, R2 602, R3 604, R4 606, R5 608, R6 610, and R7 612. Specific grouping patterns are used for illustrative purposes only, and it should noted that other groupings of the same set of nodes are envisioned (as illustrated in FIGS. 3a-c) in conjunction with the present invention. Also, as mentioned earlier, specific groupings of regions can depend on anticipated access patterns and usage.

The regions of FIG. 6 are ordered based on ascending Min Step and ascending Min Level. Table 1, provided below, depicts a list of regions ordered based upon ascending Min Step and Min Levels.

TABLE 1

| Region | Nesting Level | Min Step | Min Level | Max Step | Max Level |
|--------|---------------|----------|-----------|----------|-----------|
| R1 | 0 | 0 | 0 | 2 | 2 |
| R2 | 0 | 1 | 3 | 3 | 4 |
| R3 | 0 | 2 | 5 | 3 | 6 |
| R4 | 0 | 4 | 1 | 5 | 3 |
| R5 | 0 | 6 | 2 | 9 | 2 |
| R6 | 0 | 6 | 3 | 8 | 4 |
| R7 | 0 | 10 | 2 | 12 | 2 |

Regions are then grouped into Step Ranges. Regions within a Step Range have Min Step and Max Step values that do not overlap with that of regions in other Step Ranges. The algorithm below illustrates how to compute the Step Ranges in a set of regions:

Examine all Regions in order,
If Min Step>Max Step Seen So Far
Assign Current Step Range=Min Step Table 2, provided below, depicts Step Ranges (calculated based upon the above-mentioned algorithm) of regions of FIG. 6 and Table 1.

TABLE 2

| Region (Parameters) | Step Ranges |
|---|---|
| R1[0, 0, 0, 2, 2] | 0 |
| R2[0, 1, 3, 3, 4] | 0 |
| R3[0, 2, 5, 3, 6] | 0 |
| R4[0, 4, 1, 5, 3] | 4 |
| R5[0, 6, 2, 9, 2] | 6 |
| R6[0, 6, 3, 8, 4] | 6 |
| R7[0, 10, 2, 12, 2] | 10 |

Figure 7:
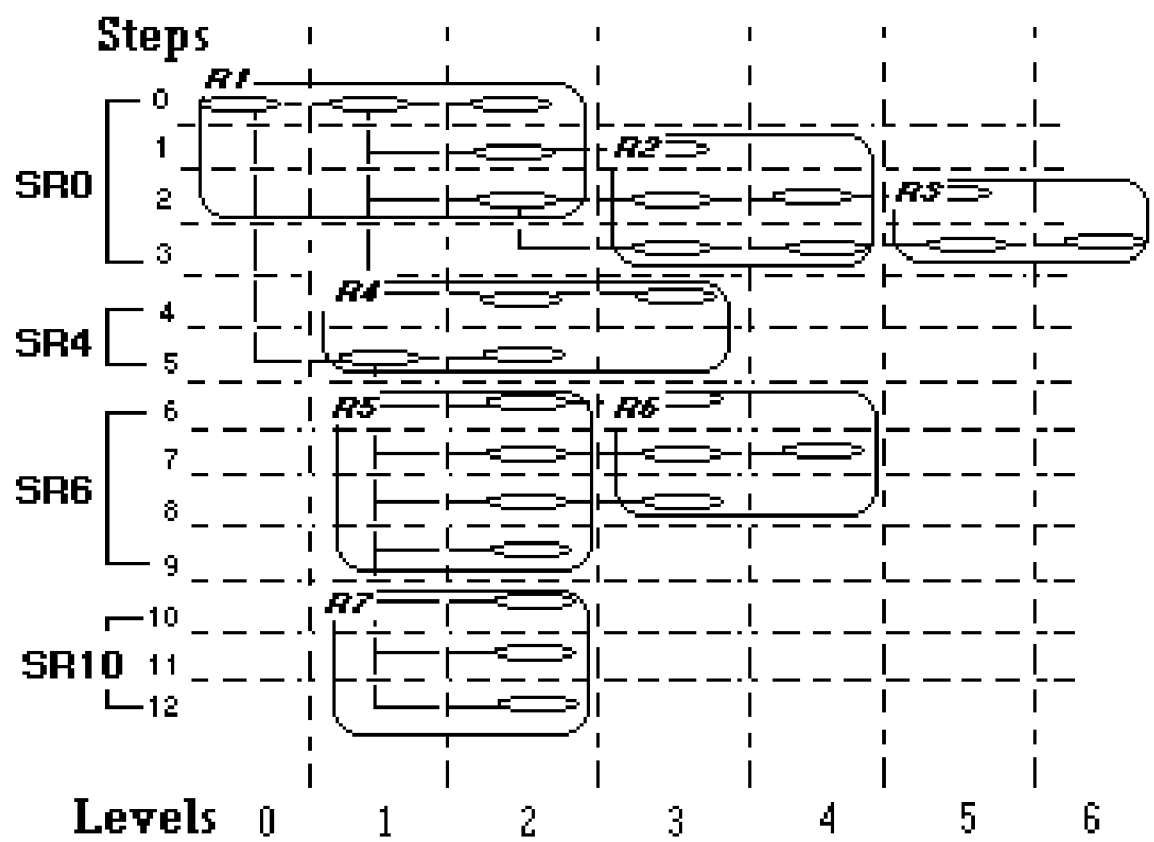
FIG. 7 illustrates the relationships among the calculated step ranges and the various regions of FIG. 6.

The relationship among the calculated step ranges and the various regions of FIG. 6 (i.e., R1 600, R2 602, R3 604, R4 606, R5 608, R6 610, and R7 612) are shown in FIG. 7. In FIG. 7, SR6 represents regions that have a step range equal to 6, which in this case encompasses regions R5 (608 of FIG. 6) and R6 (610 of FIG. 6).

Figure 8:
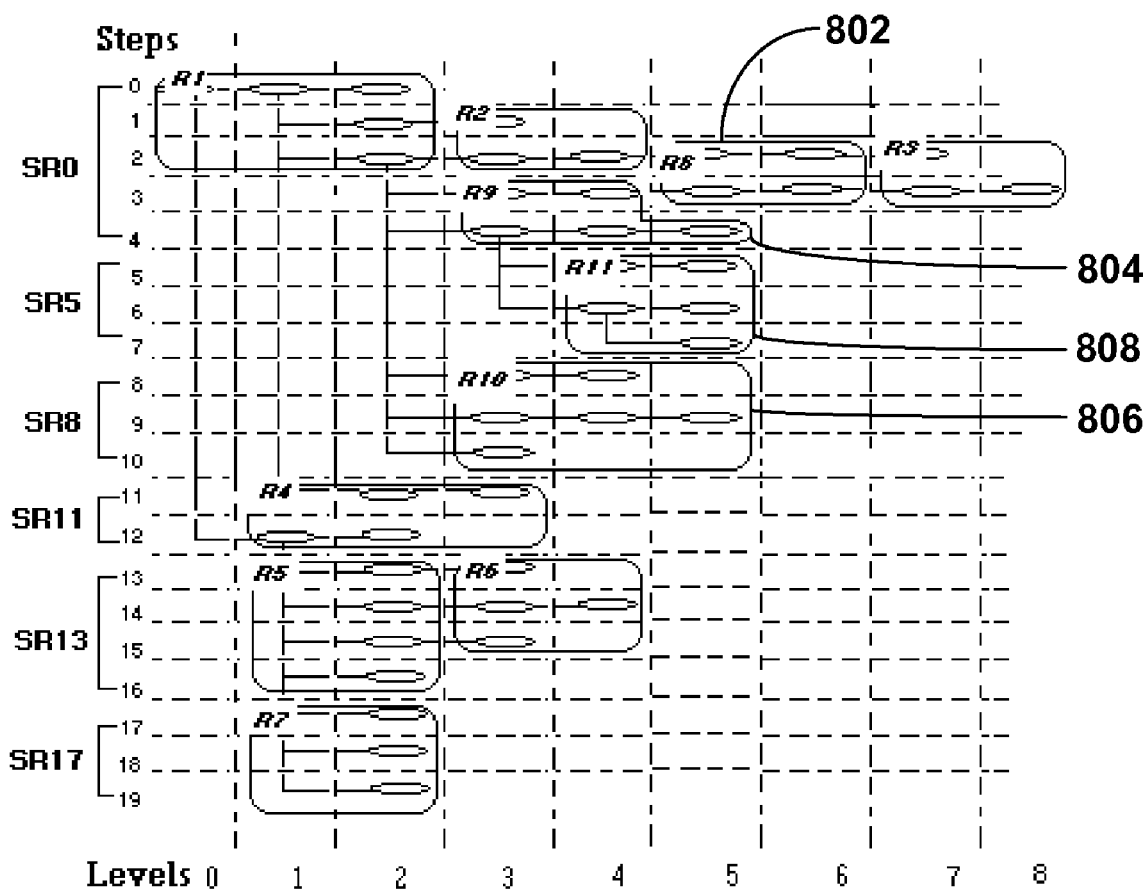
FIG. 8 illustrates an example that represents a variation of the example illustrated in FIG. 6, wherein the variation represents added nodes (and, therefore, added regions).

FIG. 8 illustrates an example that represents a variation of the example illustrated in FIG. 6, wherein the variation represents added nodes (and therefore, added regions). In addition to the regions of FIG. 6, FIG. 8 further includes regions R8 802, R9 804, R10 806, and R11 808. The addition of these regions (R8-R11) changes the Step Ranges associated with all regions depicted in FIG. 8. Table 3, provided below, depicts Step Ranges (calculated based upon the above-mentioned algorithm) of regions of FIG. 8.

TABLE 3

| Region (Parameters) | Step Ranges |
|---|---|
| R1[0, 0, 0, 2, 2] | 0 |
| R2[0, 1, 3, 2, 4] | 0 |
| R8[0, 2, 5, 3, 6] | 0 |
| R3[0, 2, 7, 3, 8] | 0 |
| R9[0, 3, 3, 4, 5] | 0 |
| R11[0, 5, 4, 7, 5] | 5 |
| R10[0, 8, 3, 10, 5] | 8 |
| R4[0, 11, 1, 12, 3] | 11 |
| R5[0, 13, 2, 16, 2] | 13 |
| R6[0, 13, 3, 15, 4] | 13 |
| R7[0, 17, 2, 19, 2] | 17 |

Figure 9:
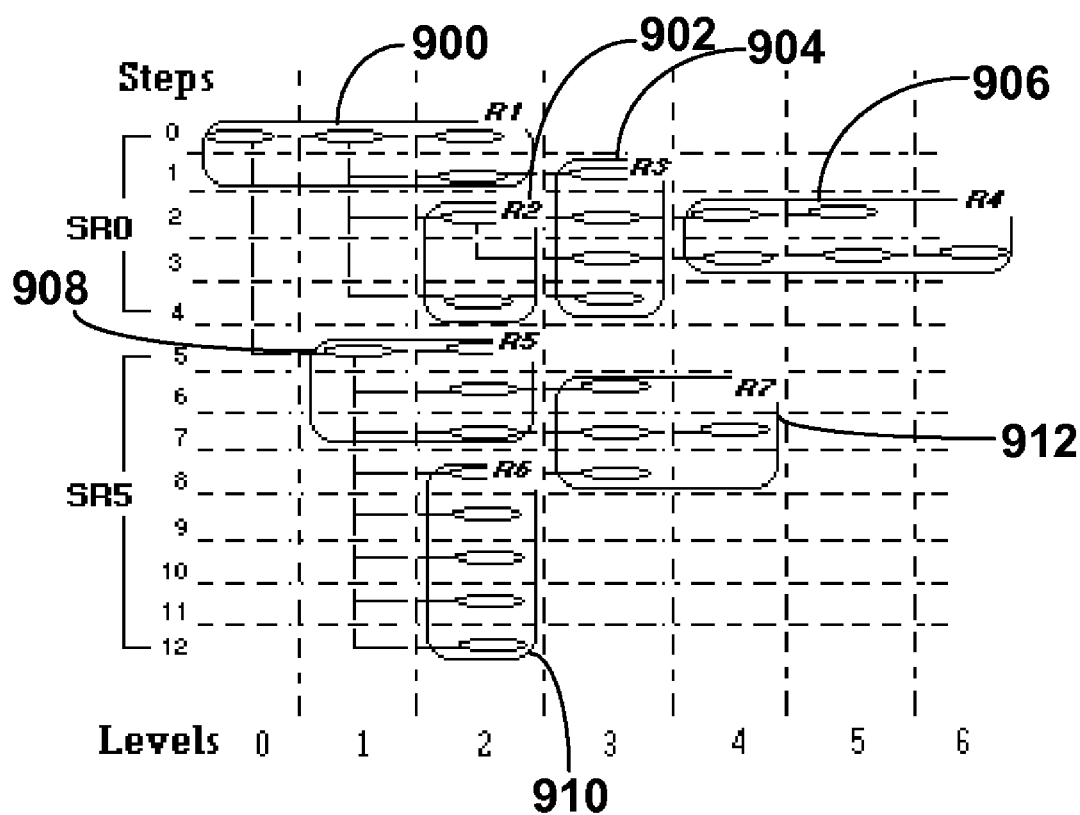
FIG. 9 illustrates an example that represents another variation of the example illustrated in FIG. 6, wherein the variation represents different ordering of regions using the same set of nodes.

FIG. 9 illustrates an example that represents another variation of the example illustrated in FIG. 6, wherein the variation represents different ordering of regions using the same set of nodes. The new set of regions of FIG. 9 includes: R1 900, R2 902, R3 904, R4 906, R5 908, R6 910, and R7 912. The regions of FIG. 9 are ordered based upon ascending Min Step and ascending Min Level. Table 4, provided below, depicts a list of regions of FIG. 9 ordered based upon ascending Min Step and Min Levels.

TABLE 4

| Region | Nesting Level | Min Step | Min Level | Max Step | Max Level |
|---|---|---|---|---|---|
| R1 | 0 | 0 | 0 | 1 | 2 |
| R3 | 0 | 1 | 3 | 4 | 3 |
| R2 | 0 | 2 | 2 | 4 | 2 |
| R4 | 0 | 2 | 4 | 3 | 6 |
| R5 | 0 | 5 | 1 | 7 | 2 |
| R7 | 0 | 6 | 3 | 8 | 4 |
| R6 | 0 | 8 | 2 | 12 | 2 |

Once the Step Ranges are determined, the regions are reordered. The previous entries ordered based on Min Step, Min Level are now ordered based on Step Range, Min Level, Min Step. In the above example, regions R2 902, R3 904 and R6 910, and R7 912 are reordered. This change accurately reflects the parent-child relationship of the regions within a Step Range. Table 5, provided below, depicts a list of regions of FIG. 9 reordered based upon Step Range, Min Levels, Min Step:

TABLE 5

| Region | Nesting Level | Min Step | Min Level | Max Step | Max Level |
|---|---|---|---|---|---|
| R1 | 0 | 0 | 0 | 1 | 2 |
| R3 | 0 | 1 | 3 | 4 | 3 |
| R2 | 0 | 2 | 2 | 4 | 2 |
| R4 | 0 | 2 | 4 | 3 | 6 |
| R5 | 0 | 5 | 1 | 7 | 2 |
| R7 | 0 | 6 | 3 | 8 | 4 |
| R6 | 0 | 8 | 2 | 12 | 2 |

Figure 10:
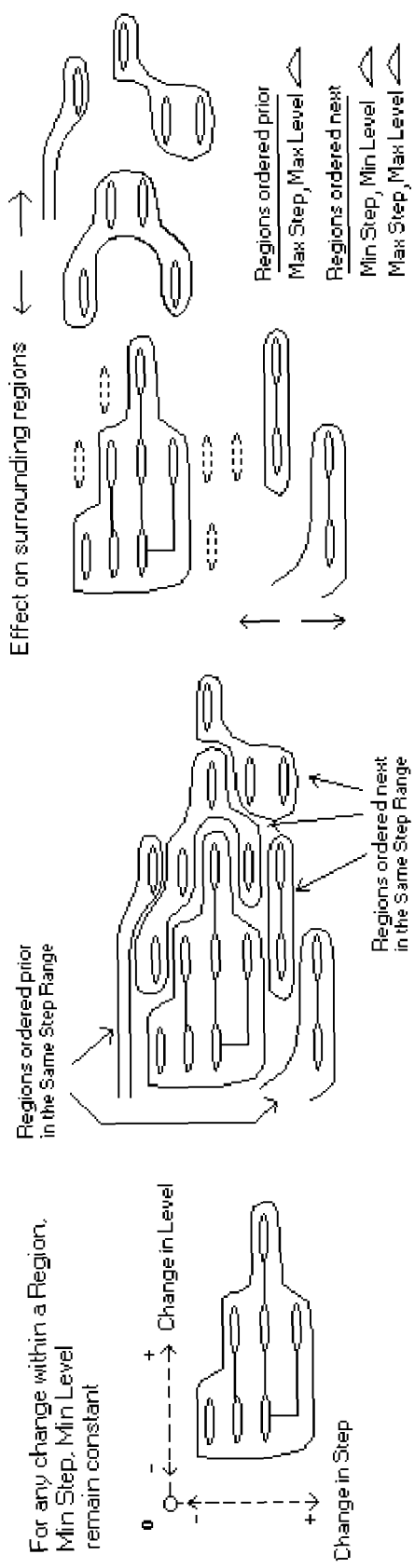
FIG. 10 illustrates changes in parameters of regions due to changes in node structure.

FIG. 10 illustrates changes in parameters of regions due to changes in node structure. When nodes added to or deleted from a region(s) are added to or deleted from a document, the Step Range, Min Level, Min Step, Max Level, and Max Step values of neighboring regions are affected. For regions in the same Step Range, retraversal of the regions needs to be performed to recompute the Min Level, Min Step, Max Level, and Max Step values. For regions in Step Ranges that follow, only the Min Step and Max Step values need adjustment.

To defer retraversal of regions during modifications, regions affected can be assigned to another nesting level. When this happens, the original set of regions retains its dimensions with respect to other regions in the same nesting level while a new set of regions with a higher nesting level is created.

Figure 11:
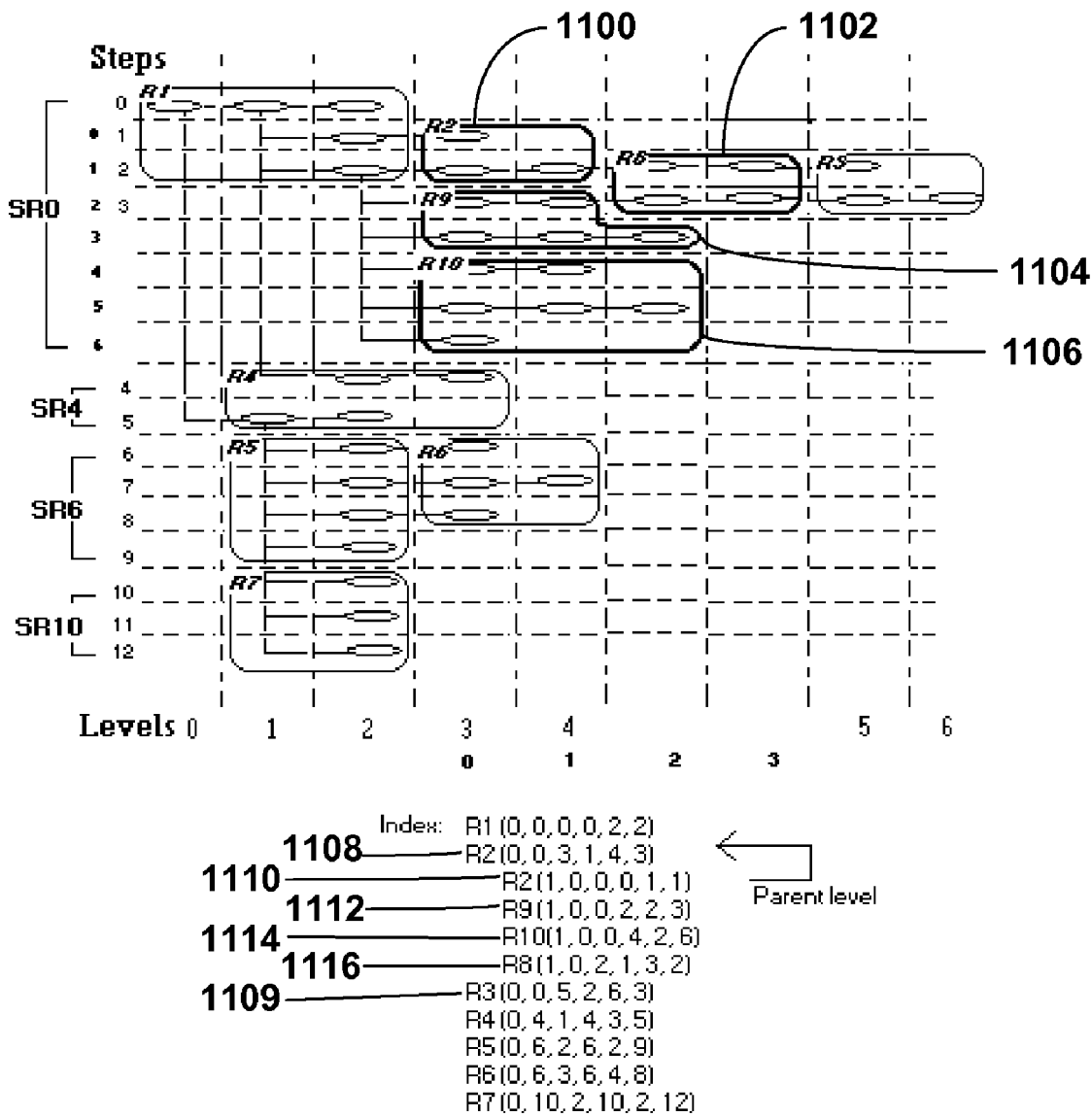
FIG. 11 illustrates the effect of the addition of nodes.

For example, as shown in FIG. 11, nodes were added to region R2 of FIGS. 6 and 7 which modified its dimensions and caused other regions R2 (of nesting level 1) 1100, R8 1102, R9 1104, and R10 1106 to be created. The index used to maintain the order of the regions still preserves the order of R2 1108 with respect to R3 1109 in nesting level 0, but now R2 1110, R9 1112, R10 1114, and R8 1116 of nesting level 1 are ordered in between (shown as tabbed entries in FIG. 11).

The regions of the new nesting level have Min Level, Min Step, Max Level, and Max Step values that are computed with respect to their parent nesting level region. For example, R8 1116 in nesting level 1 is two Levels and one Step away from the axis of R2 1108 in nesting level 0. It should be noted that, in FIG. 11, the axis of R2 1100 starts off a new Step count (from 0 to 6) and a new Level count (from 0 to 3) in nesting level 1.

Figure 12:
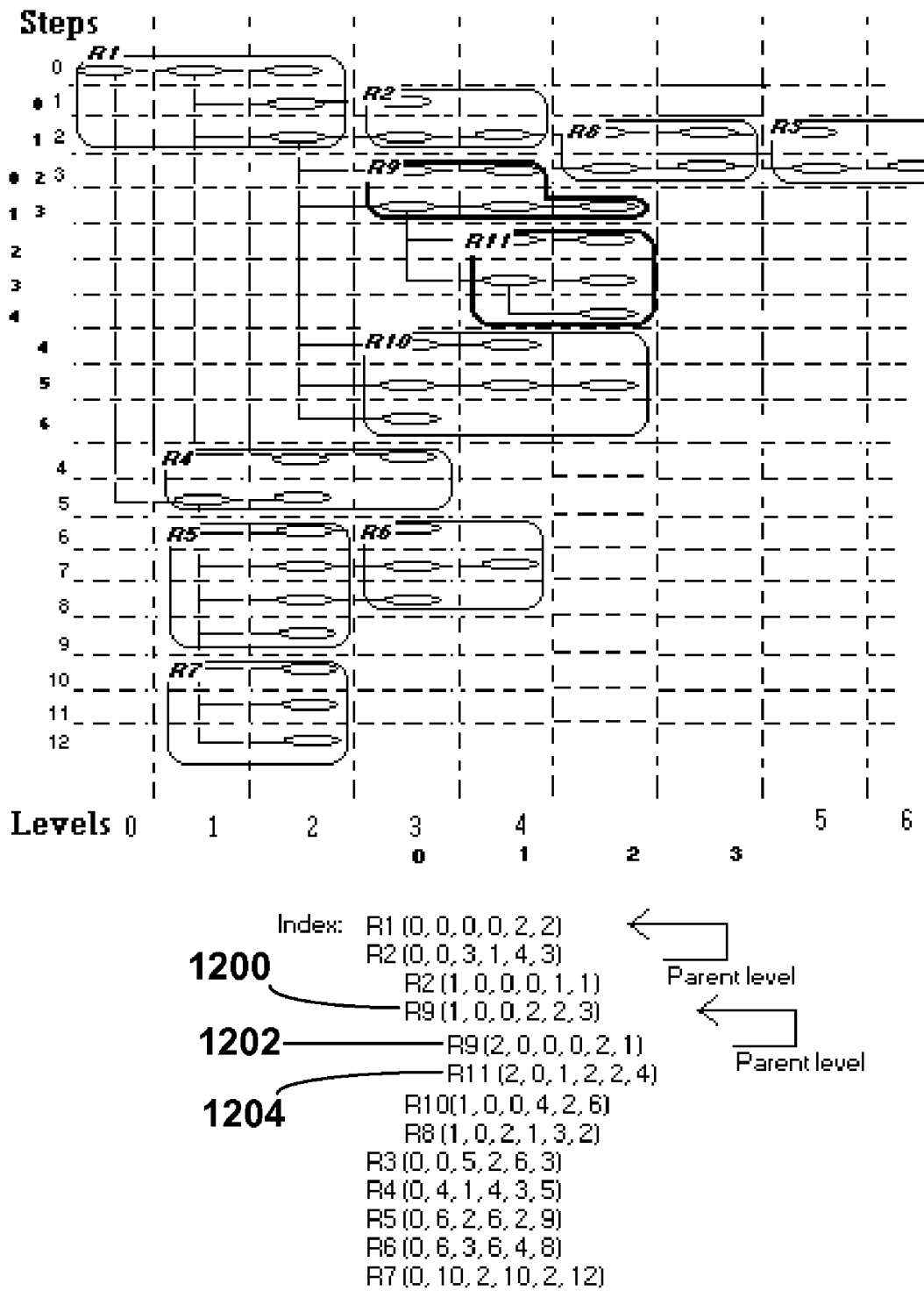
FIG. 12 illustrates the effect of nesting levels on various mapped regions.

Further modifications to the document cause more regions of higher nesting levels to be created, all based of a parent level region. For example, as illustrated in FIG. 12, R9 of nesting level 1 1200 grows, causing R9 1202 and R11 1204 of nesting level 2 to be created. Again, it should be noted that regions in ancestor nesting levels do not change.

Figure 13:
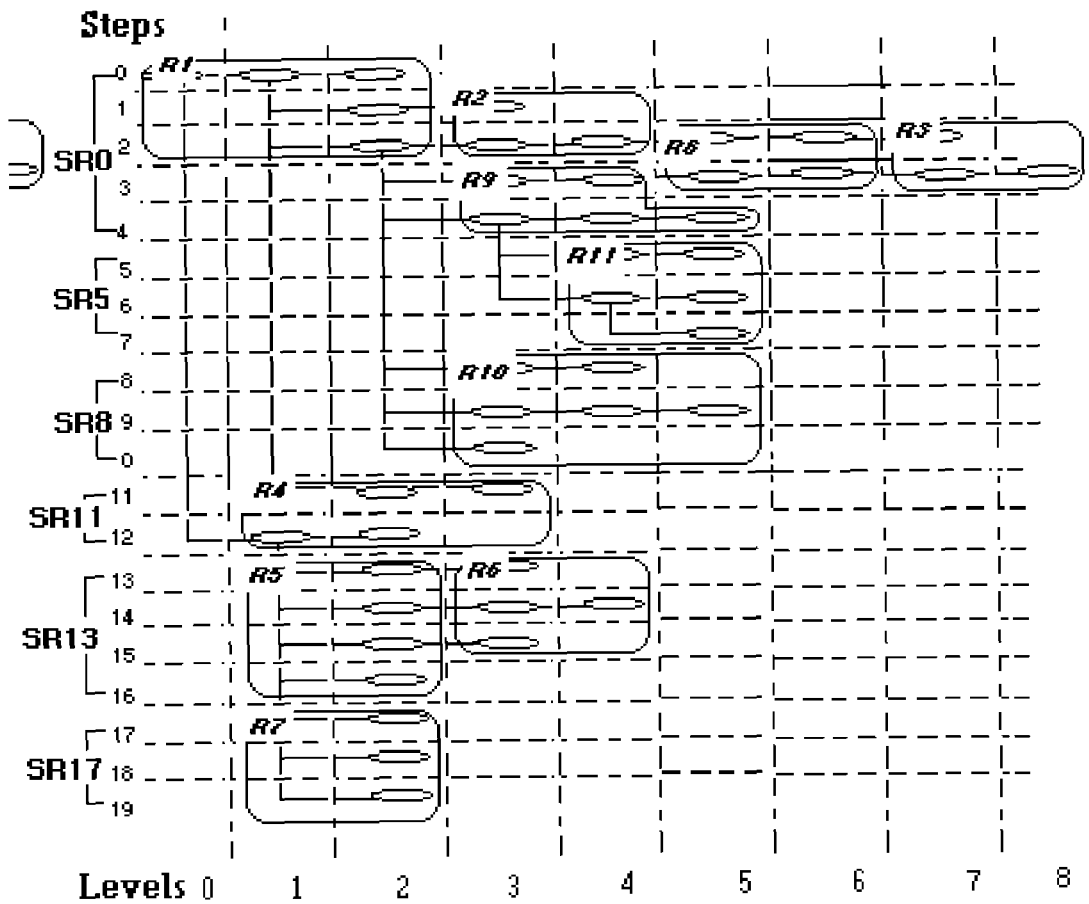
FIG. 13 illustrates reordering of regions of the document.

After the retraversal of regions within the Step Range and the adjustment of Min Step and Max Step values of the regions in the Step Ranges that follow, the regions of the document will be reordered, as shown in FIG. 13.

Figure 14B:
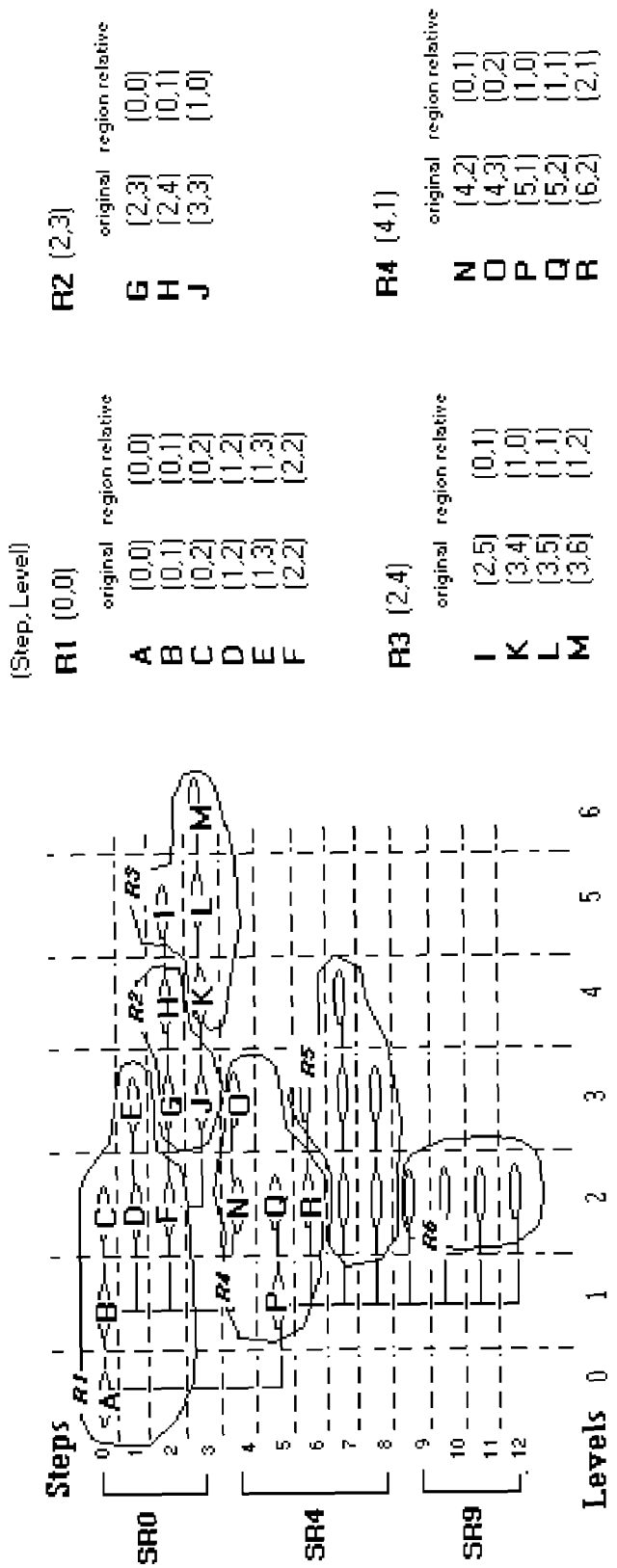
FIGS. 14a-b illustrate original and region-relative coordinates associated with nodes in various regions.
Figure 14A:

Traversals that extract information from nodes require an order for each of the nodes in the document. Step and Level values can be associated with each of the nodes to impose an order for all nodes. These values are computed relative to the Step and Level values of the containing region. Modifications in the document only affect the region coordinates which are maintained in a Region Index—not the node coordinates. In the example illustrated in FIG. 14a, the coordinate of the H node in Region R2 with Step 2, Level 3 is Step 0, Level 1 relative to the region. Therefore, H nodes' absolute coordinate is Step 2, Level 4. FIG. 14b illustrates original and region-relative coordinates associated with nodes in Regions R1-R4.

Figure 15:
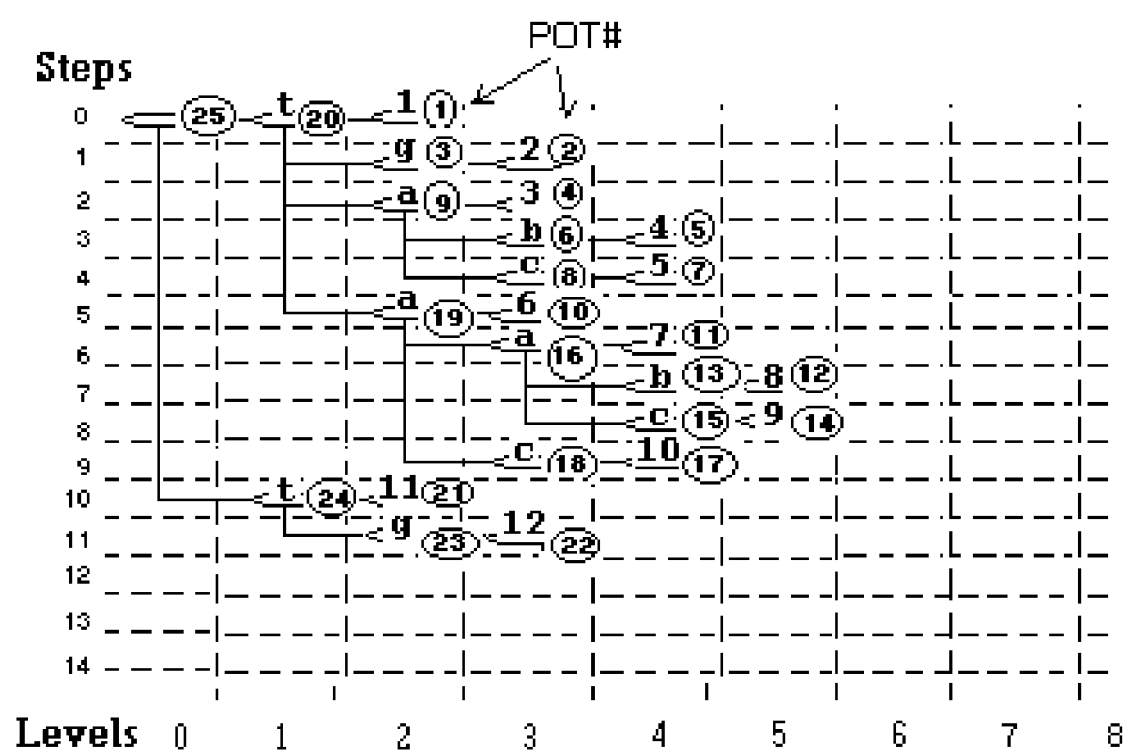
FIG. 15 illustrates a scenario wherein post order traversal (POT#) numbers can be computed for each of the nodes during traversal to identify containment relationships among nodes.

FIG. 15 illustrates a scenario wherein post-order traversal (POT#) numbers can be computed for each of the nodes during traversal to identify containment relationships among nodes. Given the Step, Level, and POT# values of two nodes, the system can determine whether one node contains the other node. In the example below, the node with Step 5, Level 2, POT# 19 contains the node with Step 7, Level 4, POT# 13; but the node with Step 10, Level 1, POT# 24 does not contain the node with Step 7, Level 4, POT# 13. The algorithm for identifying if a node N1 contains another node N2 is given below:

```
LET POT# = Post Order Traversal Number
    LEVEL = Node Level Coordinate
    STEP = Node Step Coordinate
FOR EVERY Node N1 AND Node N2
IF (N1 POT# > N2 POT#) AND
   (N1 LEVEL < N2 LEVEL) AND
   (N1 STEP <= N2 STEP)
THEN
   N1 CONTAINS N2
```

It should be noted that although algorithms identified above (e.g., in the discussions of FIG. 5a-5b) are based on a set of rules associated with how steps are computed, other variations of computing steps are also within the scope of the invention. For example, the algorithm described in relation to FIG. 5a-b has problems with updates, as it could move nodes from one region out into another region during updates. For example, if the document were a, b, c, and d, where a->b, and b->c and b->d, then a, b, and c would be assigned step 0 and d assigned step 1; but during updates, if c were removed, d would need to be moved up one step, potentially into a different region from where it was originally. A simpler way of "counting" steps is to monotonically increase the step number every time a child node is descended. That is, if the document is a->b->c, b->d, a->e, then the step numbering would be a (1), b (2), c (3), d (4), e (5). This step numbering scheme is the same as that for preorder traversal of a tree of nodes and is illustrated in FIGS. 16a-f.

Figure 16B:
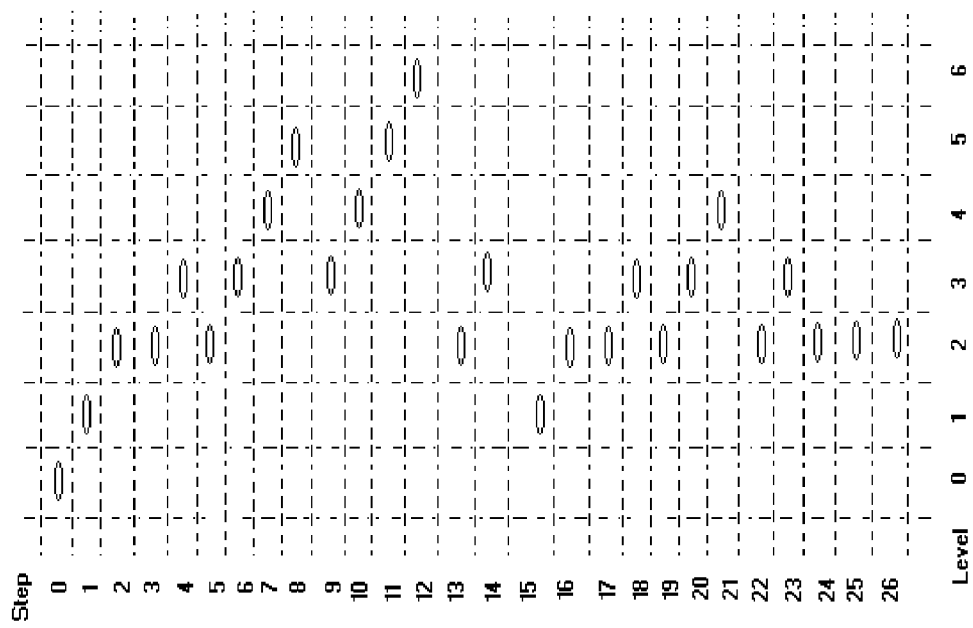
FIGS. 16a-b illustrate a set of nodes and their respective mapping based on the method of assigning a step number every time a child node is descended.
Figure 16A:
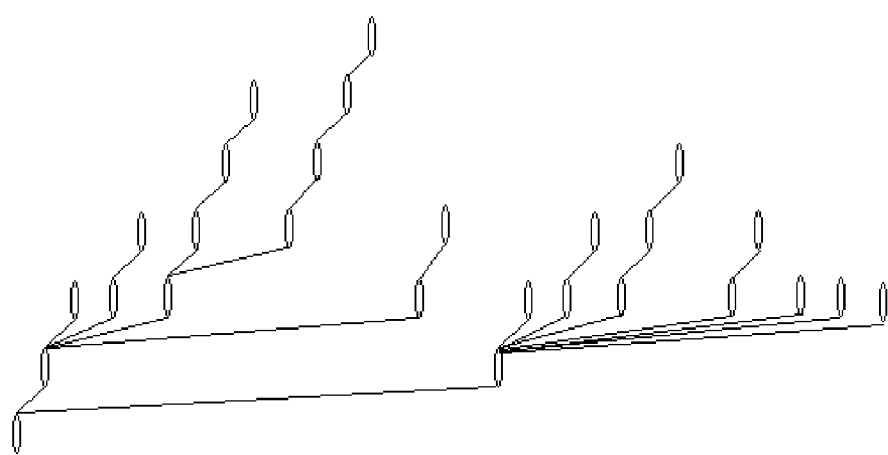
Figure 16C:
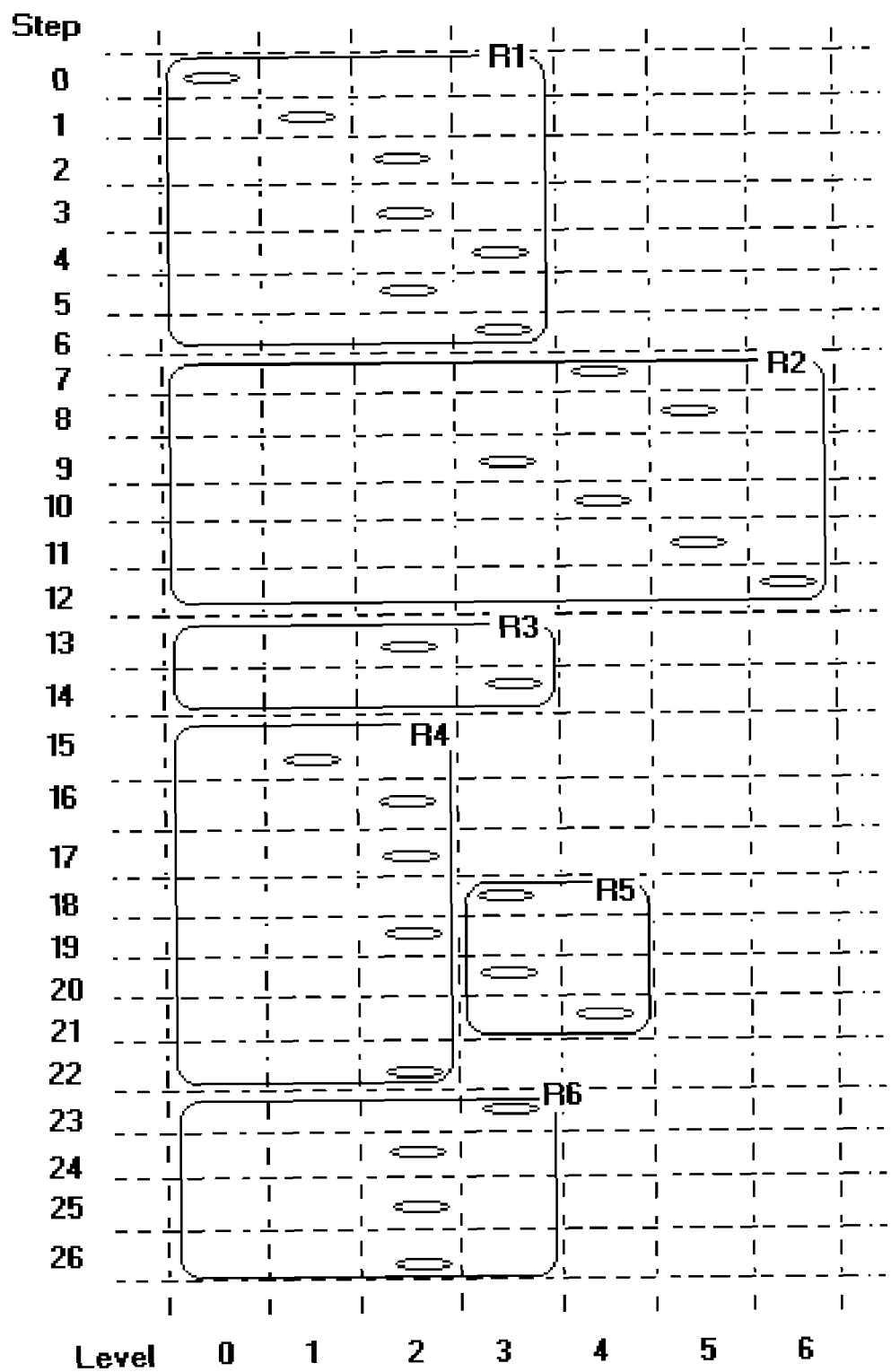
FIG. 16c illustrates regions R1 through R6 formed from the set of nodes.

FIGS. 16a-b illustrate a set of nodes and their respective mapping based on the above-mentioned method of assigning a step number every time a child node is descended. FIG. 16c illustrates regions R1 through R6 formed from the set of nodes wherein the parameters of R1 through R6 are provided below:

| Region | Min Step | Min Level | Max Step | Max Level |
|---|---|---|---|---|
| R1 | 0 | 0 | 6 | 3 |
| R2 | 7 | 0 | 12 | 6 |
| R3 | 13 | 0 | 14 | 3 |
| R4 | 15 | 0 | 22 | 2 |
| R5 | 18 | 3 | 21 | 4 |
| R6 | 23 | 0 | 26 | 3 |

Figure 16D:
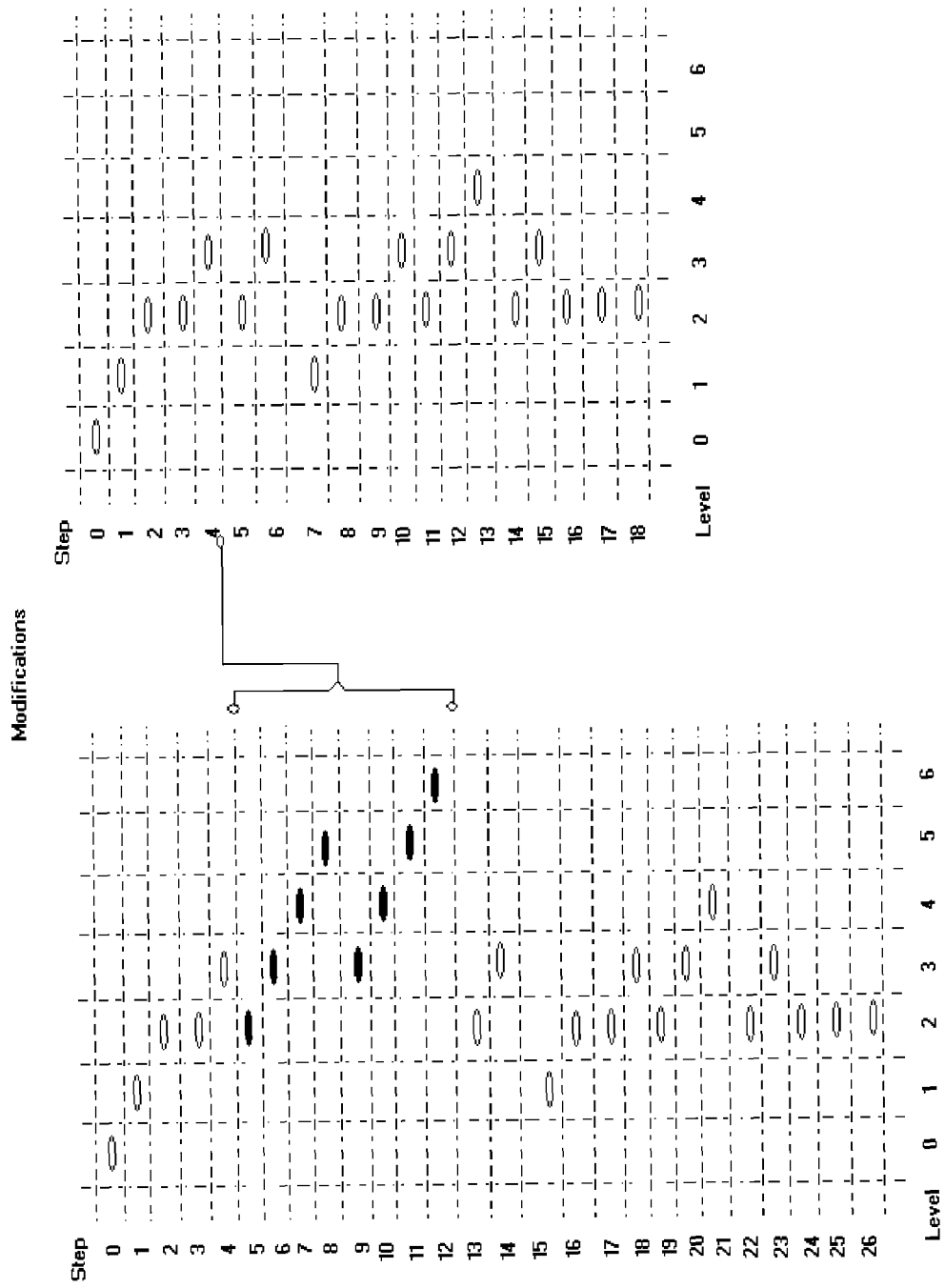
FIGS. 16d-f illustrates the effect of modifications on the above-mentioned parameters with respect to regions R1 through R6.
Figure 16E:
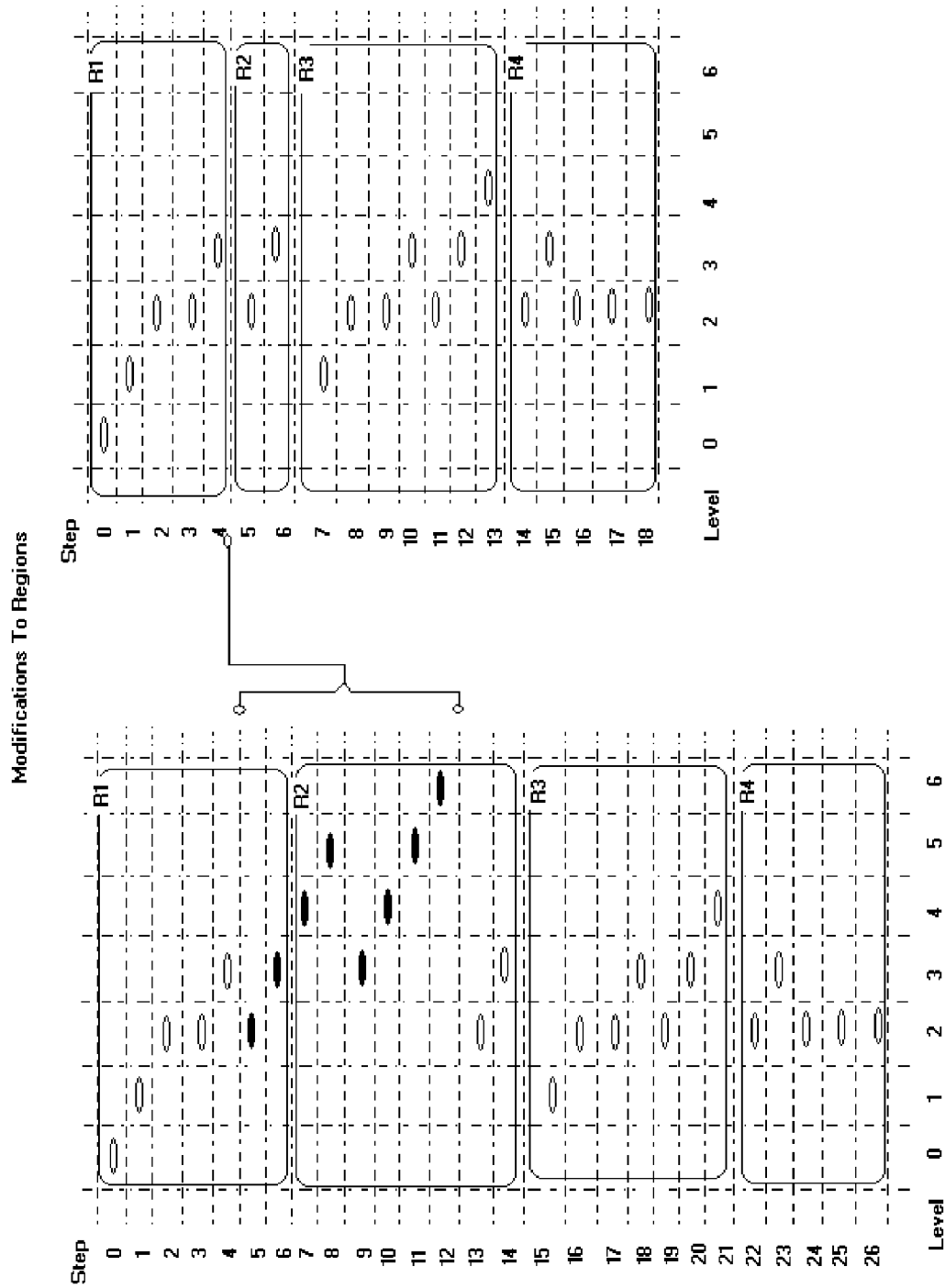
Figure 16F:
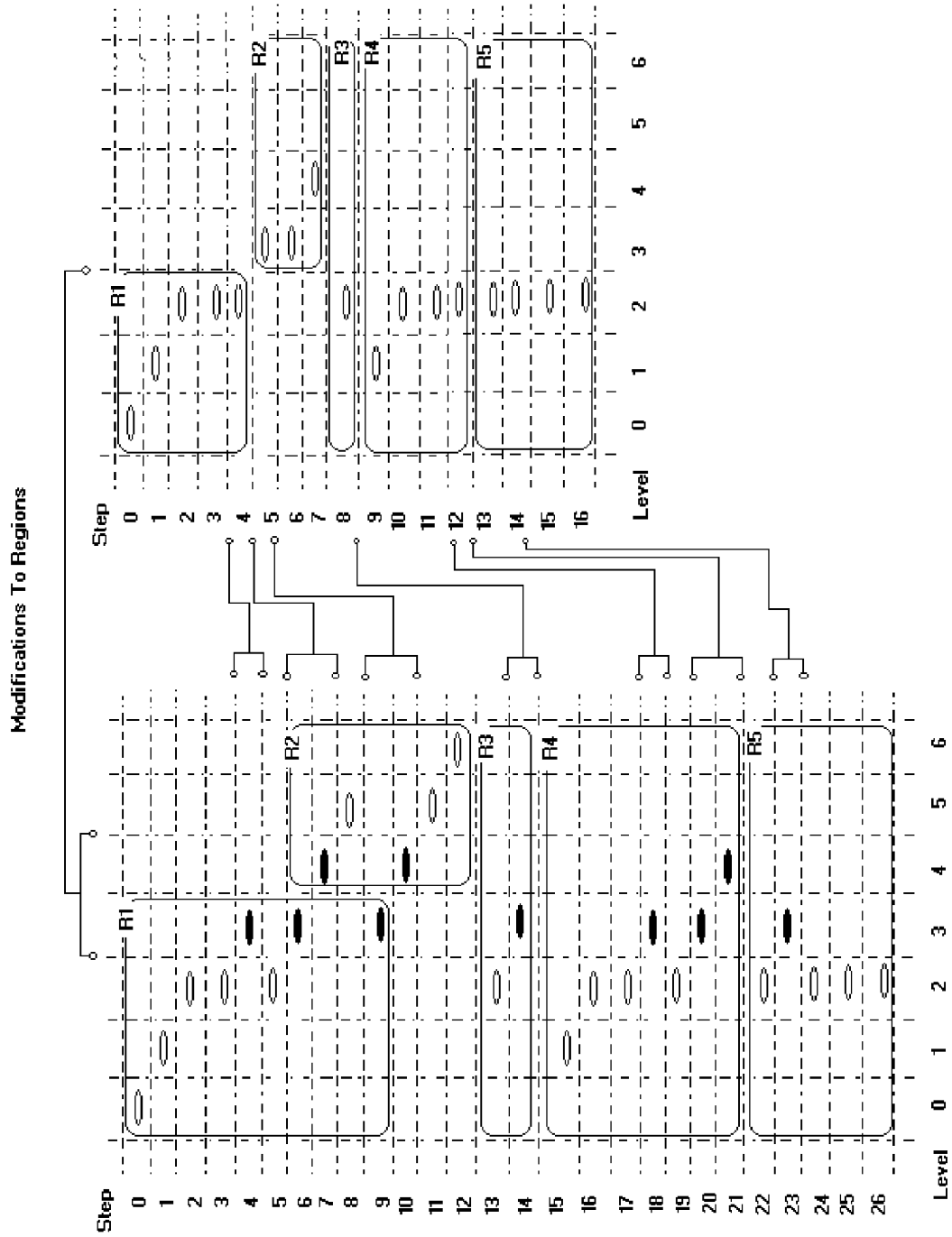

FIGS. 16d-f illustrate the effect of modifications on the above-mentioned parameters with respect to regions R1 through R6. Thus, as can be seen in the examples illustrated in FIGS. 16a-f, the specific algorithm used to compute the steps can vary and, hence, should not be used to limit the scope of the present invention.

Figure 17:
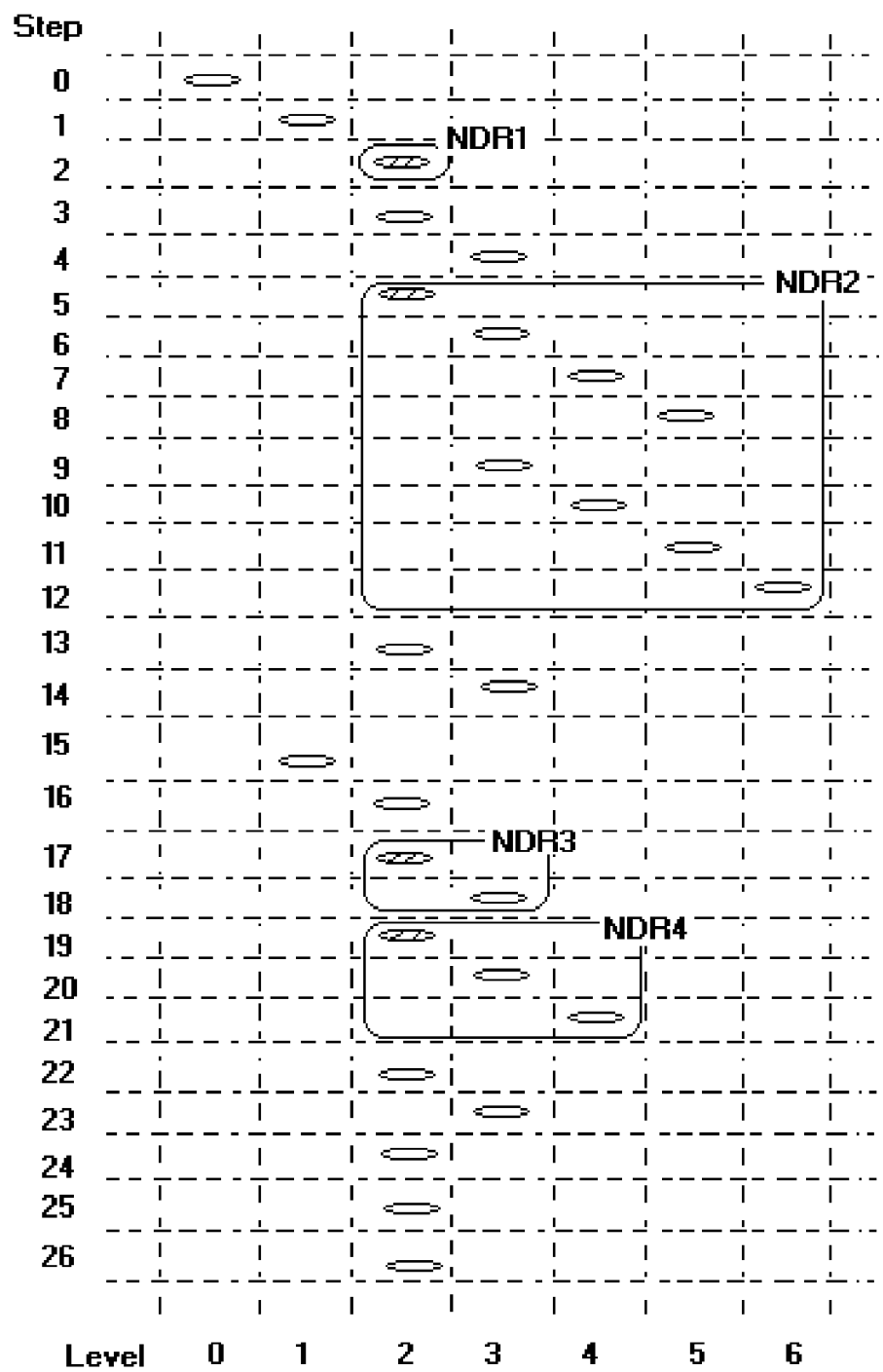
FIG. 17 illustrates nodes grouped based upon node descendant regions.

Similarly, regions can be grouped in a varying fashion. For example, as in FIG. 17, nodes can be grouped based upon node descendant regions. Node descendant regions are regions that contain all nodes that are descendents of a particular node. FIG. 17 illustrates Node Descendant Regions NDR1-NDR4, whose parameters are summarized below:

| Node Descendent Region | Min Step | Min Level | Max Step | Max Level |
|---|---|---|---|---|
| NDR1 | 2 | 2 | 2 | 2 |
| NDR2 | 5 | 2 | 12 | 6 |
| NDR3 | 17 | 2 | 18 | 3 |
| NDR4 | 19 | 2 | 21 | 4 |

Thus, as can be seen in the example above, various rules can be used to identify regions among a set of nodes and, hence, such rules should not be used to limit the scope of the present invention.

Additionally, the present invention provides for an article of manufacture comprising computer readable program code contained within, implementing one or more modules for ordering nodes in a document (e.g., XML document). Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code-based products are software modules for: (a) parsing said document; (b) creating nodes representing entities of the document and relationships that exist among the entities; (c) mapping the created nodes based upon a level and step associated with each of the nodes; (d) grouping the mapped nodes into a plurality of regions, wherein the grouping identifies, for each of the regions, at least the following parameters: a minimum step, a minimum level, a maximum step, a maximum level, said parameters giving a region its dimension and order within the document; (e) ordering the regions based upon ascending minimum step and minimum level; (f) calculating the step range associated with each of the regions; and (g) reordering the regions based upon ascending step range, minimum level, and minimum step, wherein the reordering reflecting parent-child relationships among said nodes.

CONCLUSION

A system and method have been shown in the above embodiments for the effective implementation of a method and system for ordering nodes via isolated ordered regions node order. While various preferred embodiments have been shown and described, it will be understood that there is no intent to limit the invention by such disclosure but, rather, it is intended to cover all modifications and alternate constructions falling within the spirit and scope of the invention as defined in the appended claims. For example, the present invention should not be limited by type of hierarchically-ordered document, the type of algorithm used to calculate the step, number of nodes, number of levels, number of steps, number and shape of regions, software/program, or computing environment.

The above enhancements are implemented in various computing environments. For example, the present invention may be implemented on a conventional IBM PC or equivalent, multi-nodal system (e.g., LAN) or networking system (e.g., Internet, WWW, wireless web). All programming, GUIs, display panels and dialog box templates, and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of mark-up-based languages and database programming.

The invention claimed is:

1. A method for ordering nodes in a document via isolated ordered regions, said method comprising the steps of:
   a. parsing said document;
   b. creating nodes representing entities of said document and relationships that exists among said entities;
   c. mapping said created nodes based upon a level and step associated with each of said nodes;
   d. grouping said mapped nodes into a plurality of regions, said grouping identifying, for each of said regions, at least the following parameters: a minimum step, a minimum level, a maximum step, a maximum level, said parameters giving a region its dimension and order within said document;
   e. ordering said regions based upon ascending minimum step and minimum level;
   f. calculating step range associated with each of said regions; and
   g. reordering said regions based upon ascending step range, minimum level, and minimum step, said reordering reflecting parent-child relationships among said nodes.

2. A method as per claim 1, wherein said regions are node descendant regions.

3. A method as per claim 1, wherein said method is implemented across networks.

4. A method as per claim 3, wherein said network is any of the following: local area network, wide area network, or the Internet.

5. A method as per claim 1, wherein said document is a mark-up language based document.

6. A method as per claim 5, wherein said mark-up language based document is an XML document.

7. A method as per claim 1, wherein said method comprises the additional step of monitoring the insertion or deletion of nodes in each of said regions, whereby modifications to nodes within a particular region affects only said nodes in said particular region, said modifications causing nesting levels to be created based of a parent level region.

8. A method as per claim 1, wherein said set of regions are grouped by said node grouper based upon anticipated access pattern and usage.

9. An article of manufacture comprising a computer usable medium having computer readable program code embodied therein which orders nodes in a document via isolated ordered regions, said medium comprising:
   a. computer readable program code parsing said document;
   b. computer readable program code creating nodes representing entities of said document and relationships that exists among said entities;
   c. computer readable program code mapping said created nodes based upon a level and step associated with each of said nodes;
   d. computer readable program code grouping said mapped nodes into a plurality of regions, said grouping identifying, for each of said regions, at least the following parameters: a minimum step, a minimum level, a maximum step, a maximum level, said parameters giving a region its dimension and order within said document;
   e. computer readable program code ordering said regions based upon ascending minimum step and minimum level;
   f. computer readable program code calculating step range associated with each of said regions; and
   g. computer readable program code reordering said regions based upon ascending step range, minimum level, and minimum step, said reordering reflecting parent-child relationships among said nodes.

10. An article of manufacture as per claim 9, wherein said medium further comprises computer readable program code monitoring the insertion or deletion of nodes in each of said regions, whereby modifications to nodes within a particular region affects only said nodes in said particular region, said modifications causing nesting levels to be created based of a parent level region.

11. An article of manufacture as per claim 9, wherein said document is a mark-up language based document.

12. An article of manufacture as per claim 11, wherein said mark-up language based document is an XML document.

13. An article of manufacture as per claim 9, wherein said regions are node descendant regions.

* * * * *